(12) United States Patent
Dai et al.

(10) Patent No.: US 11,087,545 B2
(45) Date of Patent: Aug. 10, 2021

(54) AUGMENTED REALITY METHOD FOR DISPLAYING VIRTUAL OBJECT AND TERMINAL DEVICE THEREFOR

(71) Applicant: Guangdong Virtual Reality Technology Co., Ltd., Guangzhou (CN)

(72) Inventors: Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/535,054

(22) Filed: Aug. 7, 2019

(65) Prior Publication Data

US 2019/0362559 A1 Nov. 28, 2019

Related U.S. Application Data

(63) Continuation of application No. PCT/CN2019/091863, filed on Jun. 19, 2019.

(30) Foreign Application Priority Data

Jun. 19, 2018 (CN) .......................... 201810632329.8
Jul. 20, 2018 (CN) .......................... 201810804399.7

(51) Int. Cl.
*G06T 19/00* (2011.01)
*G06T 19/20* (2011.01)
*G06T 7/70* (2017.01)

(52) U.S. Cl.
CPC .............. *G06T 19/006* (2013.01); *G06T 7/70* (2017.01); *G06T 19/20* (2013.01); *G06T 2207/30204* (2013.01); *G06T 2219/2004* (2013.01); *G06T 2219/2016* (2013.01)

(58) Field of Classification Search
CPC ......... G06T 19/006; G06T 7/70; G06T 19/20; G06T 2207/30204; G06T 2219/2004; G06T 2219/2016
See application file for complete search history.

(56) References Cited

U.S. PATENT DOCUMENTS

| 2012/0236034 A1* | 9/2012 | Yamashita | G06F 3/0481 |
| | | | 345/660 |
| 2014/0225919 A1* | 8/2014 | Kaino | H04N 7/183 |
| | | | 345/633 |
| 2015/0049201 A1* | 2/2015 | Liu | H04N 5/7491 |
| | | | 348/189 |
| 2016/0026242 A1* | 1/2016 | Burns | G06T 19/006 |
| | | | 345/633 |

(Continued)

FOREIGN PATENT DOCUMENTS

CN 107895397 A * 4/2018

*Primary Examiner* — Terrell M Robinson

(57) ABSTRACT

A method for displaying a virtual object includes: acquiring first spatial position information of a marker relative to a terminal device; acquiring second spatial position information of the marker relative to a target region of a physical object; determining, third spatial position information of the terminal device relative to the target region based on the first spatial position information and the second spatial position information; and displaying, based on the third spatial position information, the virtual object on the target region of the physical object.

19 Claims, 5 Drawing Sheets

(56) References Cited

U.S. PATENT DOCUMENTS

2017/0061696 A1\* 3/2017 Li ........................ G02B 27/017
2017/0287218 A1\* 10/2017 Nuernberger ........... G06T 19/20
2017/0308156 A1\* 10/2017 Runnels .................. G06F 3/011
2018/0174366 A1\* 6/2018 Nishibe ............... G06F 3/04842

\* cited by examiner

AUGMENTED REALITY METHOD FOR DISPLAYING VIRTUAL OBJECT AND TERMINAL DEVICE THEREFOR

CROSS-REFERENCE TO RELATED APPLICATIONS

This application is a continuation application of International Application No. PCT/CN2019/091863, filed on Jun. 19, 2019, which claims priority to Chinese Patent Application No. 201810632329.8, filed on Jun. 19, 2018, and Chinese Patent Application No. 201810804399.7, filed on Jul. 20, 2018. The disclosures of the aforementioned patent applications are hereby incorporated by reference in their entireties.

TECHNICAL FIELD

The present disclosure relates to the field of Augmented Reality (AR) technology, and more particularly, to a method and a device for displaying a virtual object, a terminal device, and a storage medium.

BACKGROUND

In recent years, with the advancement of science and technology, technologies such as Augmented Reality (AR) have gradually become the search hotspot a hot topic all over the world. AR is a technique that increases a user's perception of the real world through information provided by a computer system, and it superimposes content objects such as computer-generated virtual objects, scenes, or system prompts into real scenes, to enhance or modify the perception of real-world environments or data representing real-world environments. In the existing AR display technology, a terminal device cannot well display a virtual object in combination with a physical object.

SUMMARY

The embodiments of the present disclosure provide a method and a device for displaying a virtual object, a terminal device and a storage medium, aiming to better achieve a combined display of a virtual object and a physical object.

In a first aspect, an embodiment of the present disclosure provides a method for displaying a virtual object, which is applied to a terminal device. The method includes: acquiring first spatial position information of a marker relative to the terminal device; acquiring second spatial position information of the marker relative to a target region of a physical object; determining third spatial position information of the terminal device relative to the target region based on the first spatial position information and the second spatial position information; and displaying, based on the third spatial position information a virtual object on the target region of the physical object.

In a second aspect, an embodiment of the present disclosure provides a terminal device, including: a memory having a computer program stored therein; a processor, the computer program, when executed by the processor, causing the processor to execute steps of: acquiring first spatial position information of a marker relative to a terminal device; acquiring second spatial position information of the marker relative to a target region of a physical object; determining, based on the first spatial position information and the second spatial position information, third spatial position information of the terminal device relative to the target region; generating a virtual object based on the third spatial position information; and generating a virtual object based on the third spatial position information. A display position of the virtual object corresponds to the target region. The marker is relative to the terminal device.

In a third aspect, an embodiment of the present disclosure provides a non-transitory computer readable storage medium having a computer program stored thereon. The computer program, when executed by the processor, causes a processor to execute steps of: acquiring first spatial position information of a marker relative to a terminal device; acquiring second spatial position information of the marker relative to a target region of a physical object; determining, based on the first spatial position information and the second spatial position information, third spatial position information of the terminal device relative to the target region; and generating a virtual object based on the third spatial position information. A display position of the virtual object corresponds to the target region.

In a fourth aspect, an embodiment of the present disclosure provides a method for displaying a virtual object. The method includes: capturing a marker image containing a marker; identifying the marker contained in the marker image; acquiring a scaling ratio of a constructed virtual object to the marker; rendering the virtual object according to the scaling ratio; and displaying the virtual object at a display position corresponding to the marker.

In a fifth aspect, an embodiment of the present disclosure provides a terminal device, including: a memory having a computer program stored therein; and a processor. The computer program, when executed by a processor, causes the processor to execute steps of: capturing a marker image containing a marker; identifying the marker contained in the marker image; acquiring a scaling ratio of a constructed virtual object to the marker; and rendering the virtual object according to the scaling ratio. A display position of the virtual object corresponds to the marker.

In a sixth aspect, an embodiment of the present disclosure provides a non-transitory computer readable storage medium having a computer program stored thereon. The computer program, when executed by a processor, causes the processor to execute steps of: capturing a marker image containing a marker; identifying the marker contained in the marker image; acquiring a scaling ratio of a constructed virtual object to the marker; and rendering the virtual object according to the scaling ratio. A display position of the virtual object corresponds to the marker.

These and other aspects of the present disclosure will be more readily apparent from the following description of the embodiments.

BRIEF DESCRIPTION OF DRAWINGS

In order to more clearly illustrate the technical solutions in the embodiments of the present disclosure, the drawings used in the description of the embodiments will be briefly described below. It is obvious that the drawings in the following description are only some embodiments of the present application. Other drawings can also be obtained from those skilled in the art based on these drawings without paying any creative effort.

DESCRIPTION OF EMBODIMENTS

The technical solutions in the embodiments of the present disclosure will be clearly and completely described in the following with reference to the accompanying drawings in the embodiments of the present disclosure. It is apparent that the described embodiments are only a part of the embodiments of the present disclosure, and not all of them. All other embodiments obtained by a person of ordinary skill in the art based on the embodiments of the present disclosure without departing from the inventive scope will fall in the scope of the present disclosure.

Figure 1:
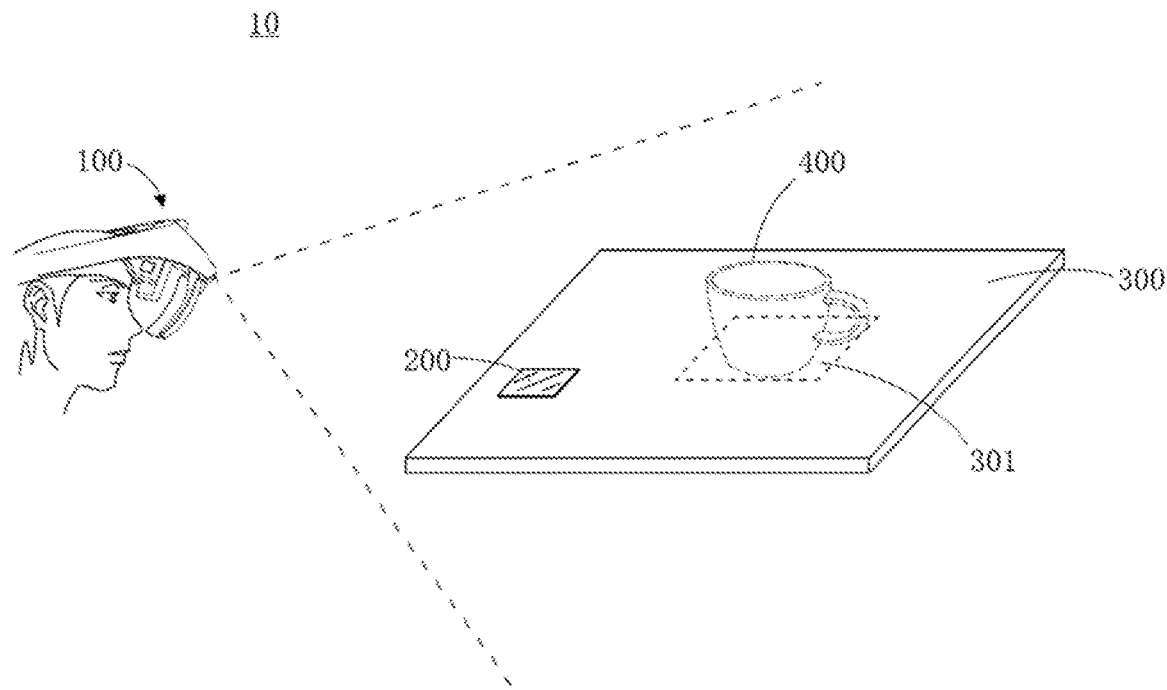
FIG. 1 is a schematic diagram of a scene of an AR system provided by an embodiment of the present disclosure.

Referring to FIG. 1, an embodiment of the present disclosure provides an augmented reality system 10, which includes a terminal device 100 and a marker 200. A camera is provided on the terminal device 100. When the marker 200 disposed on a surface of a physical object 300 is within a visual range of the camera, an image including the marker 200 may be captured by the camera, and identity information of the marker 200 and spatial position information representing a position and a pose of the terminal device 100 relative to the marker 200 may be obtained by recognizing and tracking the image including the marker 200, such that, a user can observe, via the terminal device 100, that the virtual object 400 is superimposed and displayed on a target region 301 of the physical object 300.

In some embodiments, the surface of the marker 200 may include a pattern with a topological structure. The topological structure refers to a connected relationship between sub-markers and feature points in the marker 200, and this topological structure represents the identity information of the marker 200. The outline of marker 200 may be rectangular, circle, or other shapes, which is not limited herein. The marker 200 may also be other patterns, which are not limited herein, as long as it can be identified and tracked by the terminal device 100.

In some embodiments, the terminal device 100 may be a head mounted display device or a mobile device such as a mobile phone, a tablet. The terminal device 100 may be an integral head mounted display device, which includes a processor, a memory, a display, and the like. The terminal device 100 may be a separate head mounted display device connected with an external device including a processor and a memory. In one embodiment, the terminal device 100 may also be a smart terminal (e.g., a mobile phone) connected to a head mounted display device, that is, the terminal device 100 can be used as a processing and storage device for the head mounted display device, which is inserted into and/or connected to the head mounted display device, and a virtual content may be displayed via a display of the terminal device 100.

Figure 2:
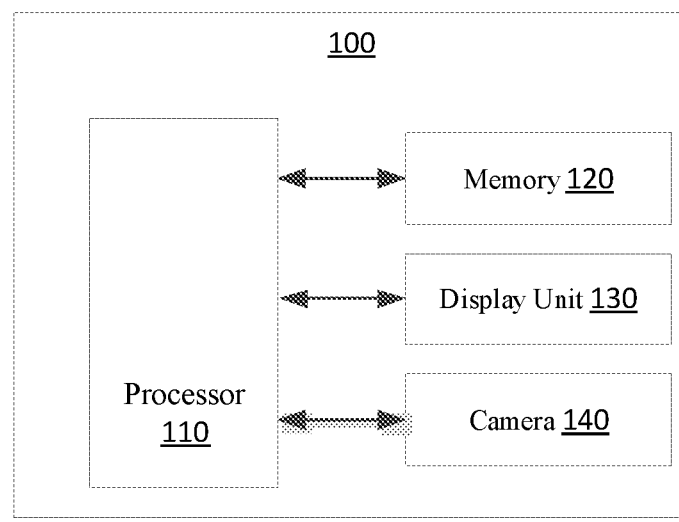
FIG. 2 is a structural block diagram of a terminal device according to an embodiment of the present disclosure.

Referring to FIG. 2, in some embodiments, the terminal device 100 may include a processor 110, a memory 120, a display unit 130 and a camera 140. The memory 120, the display unit 130 and the camera 140 may be connected to the processor 110 respectively.

The camera 140 is used to capture an image of an object to be photographed and send the image to the processor 110. The camera 140 may be an infrared camera, a RGB camera, or the like. When the camera 140 is an infrared camera, infrared light may be emitted to the marker from a lighting element within the terminal device 100 or an external lighting element, and an image including the pattern of the marker can be captured via the camera 140 by receiving infrared light reflected from the surface of the marker.

The processor 110 may include any suitable type of general-purpose or special-purpose microprocessor, digital signal processor or microcontroller, and it can be configured to receive data and/or signals transmitted from various components of the system for example, receive data and/or signals via a network, and process the data and/or signals to determine one or more operating conditions in the system. For example, the processor 110 is configured to generate image data of the virtual world according to image data stored in advance, and send the image data of the virtual world to the display unit 130 for displaying. The processor 110 is further configured to receive, by a wired or wireless network, the image data transmitted by a smart terminal or a computer, and generate an image of the virtual world according to the image data received. The processor 110 is further configured to identify the marker of the image captured by the camera to track the marker, and determine the corresponding display content.

The memory 120 can be used to store software programs and modules. The processor 110 executes various functional applications and data processing by running the software programs and modules stored in the memory 120. Memory 120 includes a non-transitory computer readable medium, such as a semiconductor, a solid-state memory, a random access memory, a read only memory, a hard disk, an optical disk, or other suitable storage medium.

It should be noted that the present disclosure is not limited to installing the processor 110 and the memory 120 in the terminal device 100. For example, when the terminal device 100 is a mobile terminal connected to an external head mounted display device, the processing executed by the processor 110 in the above embodiments is executed by the processor of the mobile terminal, and the data stored in the memory 120 in the above embodiments is stored by the memory of the mobile terminal.

In some embodiments, the terminal device 100 may also include a communication module, which is configured to communicate with other devices.

Figure 3:
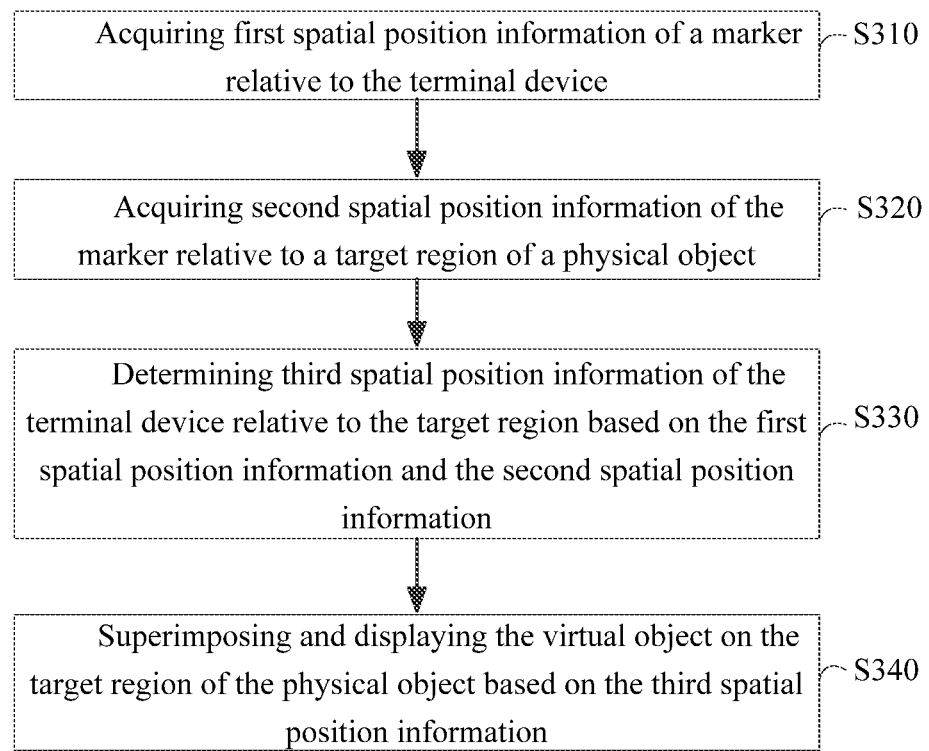
FIG. 3 is a flowchart diagram of a method for displaying a virtual object according to an embodiment of the present disclosure.

Referring to FIG. 3, an embodiment of the present disclosure provides a method for displaying a virtual object. The instructions corresponding to the method are stored in the memory 120 of the terminal device 100, and the instructions are executed by the processor 110. The method may include actions/operations in the following blocks.

At block S310, first spatial position information of the marker relative to the terminal device is acquired.

In some embodiments, an image including the marker, which is located within the visual range of the camera of the terminal device, may be captured by the camera. The first spatial position information of the marker relative to the terminal device may be obtained by identifying the image including the marker. The spatial position information represents six degrees of freedom (6DOF) information, and the first spatial position information may represent a position and a pose of the marker relative to the terminal device, and the like.

The image including the marker captured by the camera of the terminal device may be changed when the spatial position of the marker relative to the terminal device is changed, so that images may be captured with different visual angles, and the image information of the marker in the images obtained from different visual angles may be different. Therefore, the acquired first spatial position information of the marker relative to the terminal device is different from the images captured at different spatial positions via the camera of the terminal device.

In one embodiment, the identity information of the marker may be obtained by identifying the marker via the terminal device. Different markers may have different identity information, and correspondences between the markers and respective identity information are stored in the terminal device. In addition, the correspondences between the identity information of the markers and the related data may be stored in the terminal device, and the data corresponding to the marker can be obtained according to the identity information of the marker, which is identified by the terminal device. In an example, model data of a virtual object corresponding to the marker may be obtained, for example, a marker A corresponds to the data information of a virtual object 1, and the data information of the virtual object 1 is obtained based on the correspondence between the identity information of the marker A and the virtual object 1 when the identity information of the marker A is obtained by identifying the marker A.

At block S320, second spatial position information of the marker relative to a target region of a physical object is acquired.

In one embodiment, the second spatial position information of the marker relative to the target region of the physical object may be obtained by the terminal device, which is configured for determining the relative position relationship between the terminal device and the target region. The physical object may be an actual object in the real environment, and the target region of the physical object is a certain region where the virtual object needs to be displayed on the physical object, that is, the target region is a region on which the virtual object is superimposed and displayed in the real environment. For example, as shown in FIG. 1, a physical object 300 is a table in the real environment, the marker 200 is provided on a surface of the table, a target region 301 is a region on the surface of the table, and a user can observe, via the terminal device 100, that the virtual object is superimposed on the target region 301.

It should be noted that the marker is not limited to being provided on the physical object, and the target region is not limited to being a region of the physical object.

In some embodiments, the second spatial position information of the marker relative to the target region of the physical object may be pre-stored in the terminal device and can be read by the terminal device. In other embodiments, the second spatial position information of the marker relative to the target region of the physical object may be acquired by identifying the marker and the target region via the terminal device in real time.

At block S330, third spatial position information of the terminal device relative to the target region is determined based on the first spatial position information and the second spatial position information.

In one embodiment, with the marker as a reference, third spatial position information of the terminal device relative to the target region is obtained according to the first spatial position information and the second spatial position information, wherein the third spatial position information may include information such as a position and a pose of the terminal device relative to the target region.

At block S340, a virtual object is generated based on the third spatial position information, and the virtual object is displayed at a display position corresponding to the target region of the physical object.

In one embodiment, the virtual object may be determined according to the identity information of the marker, and the display coordinates of the virtual object in virtual environment can be obtained according to the third spatial position information. The display coordinate may indicate the display position of the virtual object in the virtual environment. The virtual object may be generated according to the display coordinates, and the virtual object is displayed by the display unit, and the user can observe, via the terminal device, that the virtual object is superimposed on the target region of the physical object.

In one implementation, a scaling ratio between the virtual object and the target region may be obtained by the terminal device. The display coordinate of the virtual object may be determined based on the scaling ratio and the third spatial position information, and the virtual object can be generated based on the display coordinates.

A model size of the virtual object displayed may be larger or smaller than a size of the target region of the physical object when the virtual object overlaying on the physical object. Thus, if the size of the virtual object is not scaled, it will result in that the virtual object is too large or too small, making it impossible to achieve the effect of accurately superimposing and displaying the virtual object on the target region of a physical object. Therefore, the model size of virtual object may be adjusted based on the acquired scaling ratio between the virtual object and the target region, in such a manner that the user can observe, via the terminal device, that the adjusted virtual object is accurately superimposed on the target region.

In one specific implementation, the terminal device may calculate a scaling ratio according to a ratio of the virtual object to the target region, and the virtual object to be displayed can be adjusted with the scaling ratio. Specifically, the scaling ratio may be a ratio of the size of the virtual object to the size of the target region, wherein the size may be the size of the occupied area. For example, the size of the area occupied by the virtual object in the virtual environment is 50 cm×50 cm, and the size of the target region of the physical object is 1 cm×1 cm, so that the scaling ratio of the virtual object to the target region is 50:1. The size of the virtual object may be the size of the generated virtual object model. The size of the target region may be a product of the ratio of the target region to the physical object and a pre-stored area of the physical object.

In some embodiments, a ratio of the size of the area of the virtual object to the size of the target region may be used as a scaling ratio. Alternatively, a product of a ratio of the size of the area of the virtual object to the size of the target region and a preset coefficient may be used as a scaling ratio.

The adjustment of the virtual object can be done by adjusting directly according to the ratio of the virtual object to the target region. It can also be done by adjusting according to the product of the ratio of the virtual object to the target region and a preset coefficient, for example, the preset coefficient can be between 0.7 and 1.3. It is also possible to set an experience coefficient according to a user's perception experience in order to ensure the user's experience while allowing an alignment to have a certain deviation value. A flexible scaling ratio can also be adopted to achieve self-adaptation of the size of the virtual object to the size of the target region, thereby improving the user's viewing experience.

After obtaining the scaling ratio, the terminal device can read the data corresponding to the virtual object, and the data can include model data of the virtual object. The model data is used to render the virtual object, including color of a model corresponding to the virtual object, coordinates of each vertex in the 3D model, and the like. The terminal device can construct the virtual object according to the data corresponding to the virtual object, and then adjust the size of the virtual object. For example, the terminal device displays a line segment having a certain color, and then, the 3D point queue of the line segment (point coordinates in multiple virtual environments), a thickness of the line segment, a color of the line segment and the like can be used as the model data of the virtual object.

In some embodiments, when calculating the display coordinates of the virtual object in the display space, the terminal device can take the terminal device as the origin and obtain the coordinates of the target region in the real environment according to the third spatial position information of the terminal device relative to the target region, then transform, with the terminal device as an origin, the coordinates of the target region in the real environment into the coordinates in the virtual environment, and use the coordinates of the target region in the virtual environment as the display coordinates of the virtual object, such that the display coordinates of the virtual object, which needs to be superimposed and displayed on the target region, in the virtual environment are obtained. The terminal device can render the virtual object at the calculated display coordinates so as to make the real position of the virtual object displayed by the terminal device the same as the real position of the target region in the viewing field of the terminal device, such that the display position of the virtual object corresponds to the target region in the real scene.

In some embodiments, the terminal device may determine, with the target region as an origin, spatial coordinates and rotation information of the terminal device relative to the target region according to the third spatial position information, assign the spatial coordinates and the rotation information to the terminal device and the virtual object in a content space which may refer to a spatial coordinate system in the virtual environment with the virtual object as the origin, and determine display coordinates of the virtual object based on the scaling ratio, the spatial coordinates and the rotation information. The virtual object is a root node of the content space, and the root node can be directly adjusted based on the scaling ratio, the spatial coordinates and the rotation information, such that it is possible to accurately superimpose and display the virtual object on the target region without changing the position of the virtual object, which improves the rendering efficiency.

The user can observe the virtual object through the terminal device. When the position and the pose of the terminal device relative to the target region change, the virtual object viewed by the user may also change accordingly. For example, when the terminal device is far away from the target region, the virtual object becomes smaller; and when the terminal device is close to the target region, the virtual object becomes larger.

Figure 4:
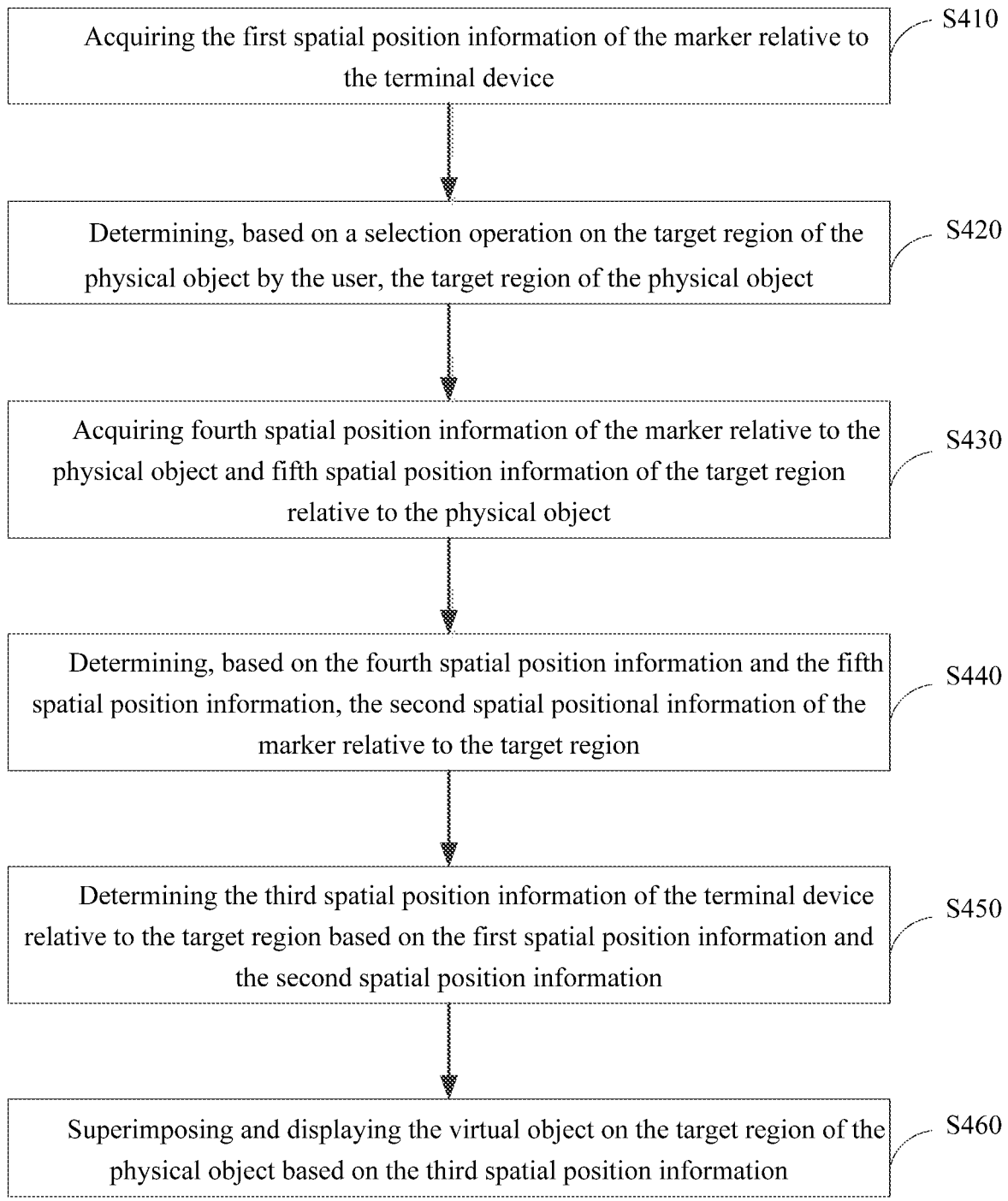
FIG. 4 is a flowchart diagram of a method for displaying a virtual object according to another embodiment of the present disclosure.

FIG. 4 shows another method for displaying a virtual object according to an embodiment of the present disclosure. The instruction corresponding to the method is executed by the processor, and the specific execution will be described as follows.

At block S410, the first spatial position information of the marker relative to the terminal device is acquired.

At block S420, the target region of the physical object is determined based on a selection operation on the target region of the physical object by the user.

In some embodiments, the user can utilize a control device to select a target region to determine the position of the target region.

As a specific implementation, the user wearing a head mounted display device can observe the physical object and select a target region by manipulating the control device. The terminal device can receive the selection instruction sent from the control device and select the target region according to the selection instruction. The control device can send its position and pose information to the terminal device while being moved, and the terminal device determines the target region according to the position and pose information of the control device.

In some embodiments, the user can perform a selection operation by using a button, a touchpad, or the like on the control device to select the target region. The control device can generate control instruction according to the touch operation, and send the control instruction to the terminal device, so that the terminal device can determine the target region according to the control instruction.

A starting point selected in the virtual environment can be obtained according to the position and pose information or the control instruction of the control device, and then, a movement trajectory of the starting point can be obtained according to the change of the position and pose of the control device, and finally, the selected region in the virtual environment can be determined according to the movement trajectory. In some embodiments, the movement trajectory may also be acquired directly according to the pose information of the control device so as to determine the target region. It is also possible to determine, according to the position of the selected region in the virtual environment and the coordinates of the physical object in the virtual environment, the positional relationship between the selected region and the physical object in the virtual environment, and then transform this positional relationship into the positional relationship in the real environment, such that the fifth spatial position information of the target region relative to the physical object can be obtained.

In some embodiments, a target region can also be selected by detecting the user's gesture. The terminal device can capture a gesture image of the user through the camera and identify the gesture image. When it is detected that the user's gesture is a preset gesture, selection of a target region is triggered, and the target region is determined according to the movement trajectory of the detected gesture.

In some embodiments, a target region can also be selected by tracking changes in an eye gaze point. For example, a camera for acquiring an image of a user's eyes may be provided in the head mounted display device, and image data of the user's retina and cornea is captured by acquiring the image of the user's eye, so as to track the eye gaze point and then determine a target region.

In some embodiments, other electronic devices connected to the terminal device, such as a mobile phone, a tablet, etc., may also be utilized to select a target region. Specifically, an electronic device connected to the terminal device stores a model of the above physical object and can display the model of the physical object. The user can select a certain region on the model of the physical object on the electronic device, and the electronic device sends the region selected by the user to the terminal device. The terminal device determines a target region according to the selected region.

In some embodiments, when it is required to adjust a superimposing position of the virtual object on the physical object, the operation of selecting the target region can be executed again. The terminal device may determine a new target region according to an instruction to select the target region again and display the virtual object in the new target region.

At block S430, fourth spatial position information of the marker relative to the physical object and fifth spatial position information of the target region relative to the physical object are acquired.

In some embodiments, the second spatial position information of the marker relative to the target region may be acquired by the terminal device according to the stored fourth spatial position information of the marker relative to the physical object and the fifth spatial position information of the target region relative to the physical object. The fifth spatial position information of the target region relative to the physical object may be obtained according to the determined specific target region. When the target region is a preset region, the fifth spatial position information may be pre-stored in the terminal device, such that the terminal device can directly read the fifth spatial position information.

At block S440, the second spatial positional information of the marker relative to the target region is determined based on the fourth spatial position information and the fifth spatial position information.

After the fourth spatial position information and the fifth spatial position information are acquired, the relative positional relationship between the marker and the target region can be determined, with the physical object as a reference, according to the fourth and fifth spatial position information, so as to obtain the second spatial position information of the marker relative to the target region.

At block S450, the third spatial position information of the terminal device relative to the target region is determined based on the first spatial position information and the second spatial position information.

At block S460, a virtual object is generated based on the third spatial position information and the virtual object is displayed at a display position corresponding to the target region of the physical object.

In some embodiments, when the first spatial position information of the marker relative to the terminal device changes, the corresponding virtual object is rendered in the target region according to the changed first spatial position information. For example, the virtual object is a house, and what was previously presented is a front of the house. When the terminal device faces the other side of the marker, the pose information relative to the marker changes, and then, a side of the house is rendered and displayed on the target region according to the model data of the virtual object. As another example, when a distance between the marker and the terminal device becomes smaller, an enlarged house can be rendered and displayed according to the model data of the virtual object and the changed distance, in such a manner that the user can observe a larger house when approaching to the marker; and when the distance between the marker and the terminal device becomes larger, a reduced house can be rendered and displayed, in such a manner that the user can observe a smaller house while distancing away from the marker. Moreover, throughout the observation process, the house is always superimposed and displayed on the target region.

In some embodiments, the method for displaying the above virtual object can be applied to some scenes in which the marker needs to be concealed, such that the terminal device identifies the marker placed at a position that does not affect the appearance of the physical object. Therefore, the user can observe that the virtual object is superimposed and displayed in the region of the physical object without affecting the overall appearance. For example, in some AR board games, a marker can be provided at a side of a physical table, and the user wears a terminal device and can observe a virtual game object superimposed and displayed on a surface of the table. When applied to a theme restaurant, a marker can also be provided at an edge of a menu, and after a terminal device identifies the marker, it is possible to observe a virtual model superimposed and displayed on some dishes of the menu, so that the user can order better. As another example, the method for displaying the virtual object can also be applied to an advertisement display in which a marker can be provided in a corner on an advertising column and it is possible to observe virtual advertisement content superimposed and displayed on a billboard after the terminal device identifies the marker.

In some embodiments, the virtual object can be directly superimposed and displayed on the marker. Namely, the target region on which the virtual object is superimposed and displayed is a position region where the marker is located.

Figure 5:
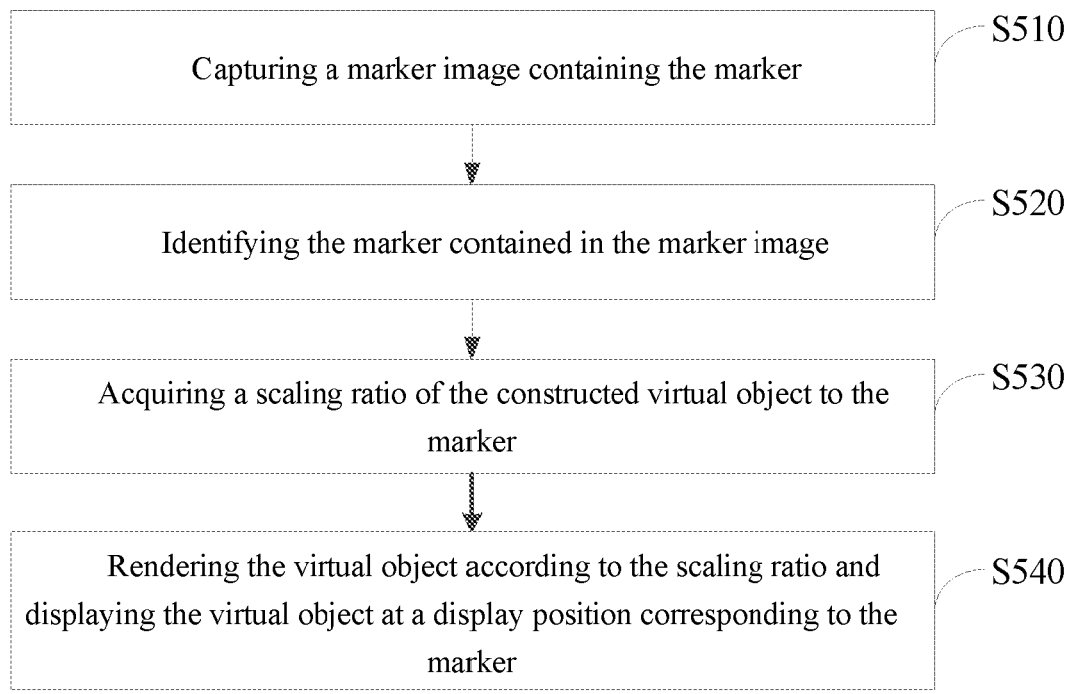
FIG. 5 is a flowchart diagram of a method for displaying a virtual object according to yet another embodiment of the present disclosure.

FIG. 5 illustrates another method for displaying a virtual object according to an embodiment of the present disclosure, and instructions corresponding to the method are executed by a processor. The specific execution will be described as follows.

At block S510, a marker image containing a marker is captured.

At block S520, the marker contained in the marker image is identified.

The terminal device can identify the marker according to the captured marker image, and obtain identity information of the marker and relative position and pose information between the terminal device and the marker.

At block S530, a scaling ratio of a constructed virtual object to the marker is acquired.

The terminal device can calculate the scaling ratio according to a ratio of the virtual object to the marker so as to achieve scaling of the virtual object. The scaling ratio is a ratio of a size of the virtual object to a size of the marker, and the ratio of the sizes may refer to a ratio of a size of occupied areas. For example, the size of the virtual object is 100 cm×100 cm, the size of the marker is 1 cm×1 cm, and then the scaling ratio of the virtual object to the marker is 100:1.

In some embodiments, the ratio of the size of the virtual object to the marker can be used as the scaling ratio. Alternatively, a product of the ratio of the virtual object to the marker and a preset coefficient is used as the scaling ratio, for example, the preset coefficient can be between 0.8 and 1.2. It is also possible to set an experience coefficient according to a user's perception experience, in order to ensure the user's experience while allowing an alignment to have a certain deviation value. A flexible scaling ratio can also be adopted to achieve self-adaptation of the size of the virtual object to the size of the marker, thereby improving the user's viewing experience.

At block S540, the virtual object is rendered according to the scaling ratio, and the virtual object is displayed at a display position corresponding to the marker.

In some embodiments, when an enlargement instruction for the virtual object is received, the scaling ratio is enlarged; and when a reduction instruction for the virtual object is received, the scaling ratio is reduced. The enlargement instruction or the reduction instruction may be issued by the user through a controller of the terminal device, and it can also be issued by voice. In addition, it can also be determined by the terminal device according to a length of time duration during which the user observes the virtual object.

The terminal device can determine display coordinates of the virtual object according to the scaling ratio, render the virtual object according to the display coordinates representing a three-dimensional position of the virtual object in a virtual environment, and then generate a corresponding virtual image and display it through the display device. The displayed virtual object conforms to the corresponding scaling ratio, and the user can observe, through the terminal device, that the scaled virtual object is superimposed and displayed on the marker, and display the virtual object being aligned with the marker, thereby achieving that the virtual object is randomly positioned relative to the camera.

Figure 6:
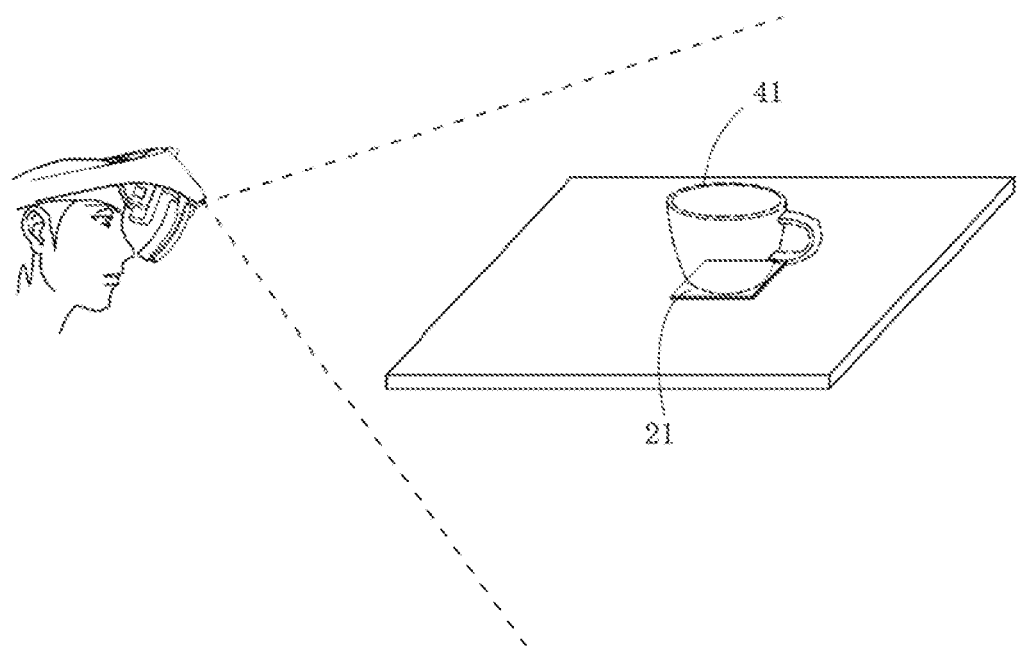
FIG. 6 schematically illustrates a virtual object displayed while being aligned with a marker.

FIG. 6 illustrates a virtual object displayed while being aligned with a marker. When the user observes through the terminal device, it can be seen that the virtual object 41 is superimposed and displayed on the marker 21, and the virtual object 41 is aligned with the marker 21.

The terminal device can read data corresponding to the virtual object corresponding to the marker, acquire a display position of the virtual object in the virtual environment of the terminal device, and render and display the virtual object at the display position of the virtual environment, such that a real position of the virtual object in content displayed by the terminal device is the same as a real position of the marker observed by the user, that is, the virtual object is displayed on the marker of the real scene. In some embodiments, the user of the terminal device can observe the virtual object from different viewing angles. The user of the terminal device can move, and the virtual object will also change with the position move of the user.

The method for displaying the virtual object provided by the present embodiment identifies a marker contained in a marker image by capturing the marker image, acquires a scaling ratio of a constructed virtual object to the marker, renders the virtual object according to the scaling ratio and superimposes and displays it on the marker, thereby achieving self-adaptation of a size of the virtual object to a size of the marker.

In some embodiments, after the terminal device identifies the marker contained in the marker image, relative position and pose information between the marker and the terminal device can be acquired. The relative position and pose information between the marker and the terminal device may be relative coordinates and rotation information of the marker and the terminal device in different coordinate spaces.

In one embodiment, the terminal device may acquire, with the terminal device as an origin, first relative position information of the marker and the terminal device in a first coordinate space. The first coordinate space is a device space. In the device space, the first relative position information in the first coordinate space is acquired with the terminal device as the origin, that is, coordinates and rotation information of the marker relative to the terminal device in the device space are obtained.

After the terminal device acquires the first relative position information, the first relative position information may be reversely restored with the marker as the origin, to obtain second relative position information of the marker and the terminal device in a second coordinate space. The second coordinate space is a reference coordinate space. In the reference coordinate space, the first relative position information is reversely restored with the marker as the origin, that is, relative coordinates and rotation information of the terminal device relative to the marker are obtained.

Since reference coordinates, i.e., origins of the coordinates, in two coordinate systems of the device space and the reference spatial coordinates are different, the first relative position information needs to be reversely restored to obtain the second relative position information in the second coordinate space, and the relative coordinates and rotation information of the terminal device and the marker are mirror relationships in the two coordinate spaces. As a specific implementation, acquiring the second relative position information in the second coordinate space can be done by 1:1 reversing the relative coordinates and rotation information of the terminal device and the marker in the device space to obtain the relative coordinates and rotation information of the terminal device and the marker in the reference coordinate space. The coordinates of the marker in the device space can be transformed into the coordinates of the terminal device in the reference coordinate space, so as to obtain, with the marker as the origin, the coordinates and rotation information of the terminal device relative to the marker in the reference coordinate space. For example, the coordinates of the marker relative to the terminal device in the device space are (−6, −8, 1) with the terminal device as the origin, and the coordinates of the terminal device relative to the marker in the reference coordinate space are (6, 8, −1), with the marker as the origin, after the coordinate transformation.

In some embodiments, the terminal device may assign the second relative position information to the terminal device and the virtual object in the third coordinate space, and calculate the second relative position information according to the scaling ratio to obtain display coordinates of the virtual object.

The third coordinate space is the content space. As a specific implementation, in order to accurately superimpose the virtual object and the marker, the coordinates and orientations of the virtual object and the terminal device in the content space may be the same as the relative coordinates and orientations of the marker and the terminal device in the reference coordinate space. The terminal device can assign the relative coordinates and orientation of the terminal device and the marker in the reference coordinate space to the terminal device and the virtual object in the content space, and then calculate the assigned second relative position information according to the scaling ratio, to determine the display coordinates of the virtual object. For example, assuming that a size of the virtual object is 100 cm×100 cm and a size of the marker in the real world is 0.1 cm×0.1 cm, then the scaling ratio is 1000. The change coordinates of the terminal device in the device space can be scaled according to the scaling ratio of the content space, for example, the coordinates of the terminal device in the device space are (0, 0, −3) and then become (0, 0, −3000) after being scaled by the scaling ratio, so that the display coordinates of the virtual object in the virtual environment can be obtained. The virtual object is a root node in the content space. In the process of determining the display coordinates, there is no need to move the position of the virtual object in the virtual environment, and the adaptation of the virtual object and the marker can be achieved simply by adjusting the root node, thereby improving rendering efficiency.

In some embodiments, when the position and pose information of the marker relative to the terminal device changes, movement parameters of the marker relative to the terminal device are acquired. The movement parameters may include an angle, a distance, an orientation and the like of the movement of the marker relative to the terminal device. When the marker moves relative to the terminal device, it indicates that the relative position or angle of the user and the marker has changed, or the position or angle of the marker has changed. The movement may be a horizontal movement and/or a change in the user's pitch angle, and at this time, the user may need to observe the virtual object from different angles or different distances. It is possible to re-determine the relative position information between the marker and the terminal device according to the movement parameters, re-acquire the display coordinates of the virtual object according to the re-determined relative position information, and re-render the virtual object using the re-acquired display coordinates. Therefore, it can guarantee that no matter how the terminal device or the marker moves, the displayed virtual object is always superimposed on the marker and aligned with the marker.

In some embodiments, when there are at least two virtual objects corresponding to the marker, the terminal device may respectively acquire a scaling ratio of each virtual object relative to the marker, and the acquired scaling ratio is a pre-stored ratio, i.e., a ratio when there is a single virtual object placed on the marker. It is possible to determine a corresponding region of each virtual object on the marker, adjust the scaling ratio corresponding to each virtual object according to the corresponding region of a respective virtual object on the marker, and superimpose and display the virtual object on the marker according to the adjusted scaling ratio of the respective virtual object.

When there are multiple virtual objects, regions on which different virtual objects, when being displayed, are superimposed on the marker are different. The sizes of the superimposing regions may be the same or different. In some embodiments, the superimposing region on the marker can be determined according to a size relationship of each virtual object and the marker. For example, it is assumed that there are two virtual objects OB1 and OB2 that need to be superimposed and displayed on the marker. The size of the marker is S0, and a ratio of a size of the virtual object OB1 to that of the virtual object OB2 is S1:S2, such that the display region of the virtual object OB1 on the marker is S0×[S1/(S1+S2)], and the superimposing region of the virtual object OB2 on the marker is S0×[S1/(S1+S2)], according to the ratio of the sizes.

Figure 7:
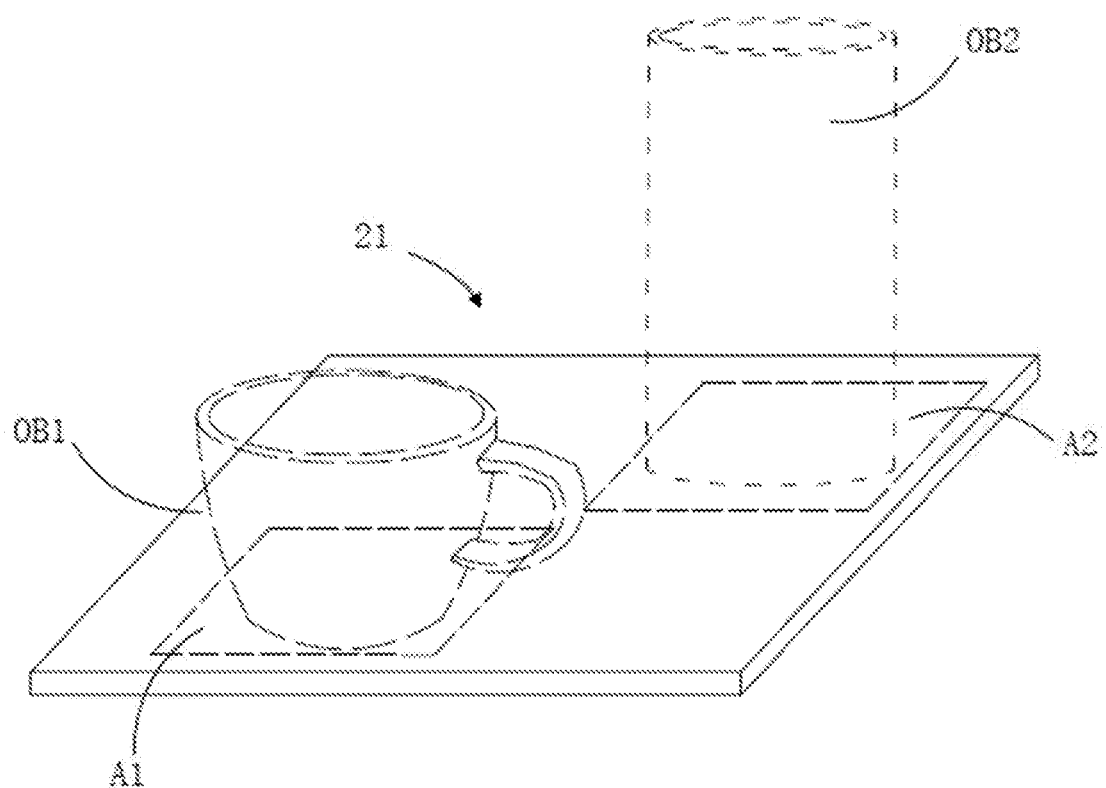
FIG. 7 schematically illustrates a scene in which there are two virtual objects in one embodiment.

In some embodiments, the superimposing region of each virtual object on the marker may also be preset respectively, and the scaling ratio of the virtual object can be adjusted according to the set superimposing region. Referring to FIG. 7, the virtual object OB1 and the virtual object OB2 are superimposed on the marker 21, and the virtual object OB1 needs to be superimposed and displayed on the region A1 on the marker 21, and the virtual object OB2 needs to be superimposed and displayed on the region A2 on the marker 21. The scaling ratio of the virtual object OB1 can be adjusted according to the size of the region A1 in such a manner that the virtual object OB1 is displayed while being aligned with the region A1, and the scaling ratio of the virtual object OB2 can be adjusted according to the size of the region A2 in such a manner that the virtual object OB2 is displayed while being aligned with the region A2.

In one embodiment, the present disclosure further provides a terminal device, including a memory and a processor. A computer program is stored in the memory. The computer program, when executed by the processor, causes the processor to implement the method for displaying the virtual object described above.

In one embodiment, the present disclosure further provides a non-transitory computer readable storage medium on which a computer program is stored. When the computer program is executed by the processor, the method for displaying the virtual object described above can be implemented.

The above description is only preferred embodiments of the present disclosure and is not intended to limit the present disclosure in any way. Although the present disclosure has been disclosed above in the preferred embodiments, it is not intended to limit the present disclosure, any person skilled in the art can make some changes to the above disclosed technology content or modify it into equivalent embodiments having equivalent variations without departing from the scope of the present disclosure. Therefore, any simple modifications, equivalent changes, and modifications made to the above embodiments in accordance with the technical spirit of the present disclosure are still within the scope of the technical solutions of the present disclosure.

What is claimed is:

1. A method for displaying a virtual object, the method comprising: a terminal device worn by a user acquiring first spatial position information of a marker relative to the terminal device, wherein the marker is disposed on a physical object other than the user; determining a target region of the physical object according to a selection operation, wherein the selection operation is determined by a control device; acquiring second spatial position information of the marker relative to the target region of the physical object; determining third spatial position information of the terminal device relative to the target region based on the first spatial position information and the second spatial position information; generating the virtual object based on the third spatial position information; and acquiring a scaling ratio between the virtual object and the target region; determining, with the target region as an origin, spatial coordinates and rotation information of the terminal device relative to the target region, according to the third spatial position information; assigning, in a content space, the determined spatial coordinates and the determined rotation information to the terminal device and the virtual object, the content space having the virtual object as an origin; determining display coordinates of the virtual object based on the scaling ratio, the assigned spatial coordinates and the assigned rotation information; generating and rendering the virtual object based on the display coordinates; displaying the virtual object, thereby the user views the virtual object, through the terminal device worn by the user, on the target region of the physical object, and the method further comprises: acquiring movement parameters of the marker relative to the terminal device, when the position and pose information of the marker relative to the terminal device changes, re-determining relative position information between the marker and the terminal device according to the movement parameters; re-acquiring the display coordinates of the virtual object according to the re-determined relative position information, and re-rendering the virtual object using the re-acquired display coordinates.

2. The method according to claim 1, wherein acquiring the scaling ratio between the virtual object and the target region comprises: determining a ratio of a size of the virtual object to a size of the target region as the scaling ratio; or determining a product of the ratio of the size of the virtual object to the size of the target region and a preset coefficient as the scaling ratio.

3. The method according to claim 1, wherein there are at least two virtual objects, and for each of the at least two virtual objects, acquiring the scaling ratio between the virtual object and the target region comprises: acquiring the scaling ratio of the virtual object to the target region; determining a corresponding region of the virtual object on the target region; and adjusting the scaling ratio corresponding to the virtual object according to the corresponding region of the virtual object on the target region.

4. The method according to claim 1, further comprising: enlarging the scaling ratio when an enlargement instruction for the virtual object is received; and reducing the scaling ratio when a reduction instruction for the virtual object is received.

5. The method according to claim 1, wherein acquiring the second spatial position information comprises: acquiring fourth spatial position information of the marker relative to the physical object and fifth spatial position information of the target region relative to the physical object; and determining the second spatial position information of the marker relative to the target region based on the fourth spatial position information and the fifth spatial position information.

6. The method according to claim 1, wherein displaying the virtual object at a display position on the target region of the physical object comprises: changing positions of the virtual object viewed by the user as well as the user moves.

7. The method according to claim 1, wherein the movement parameters comprises an angle, a distance, an orientation of movement of the marker relative to the terminal device.

8. The method according to claim 1, further comprising: determining, by the terminal device, an enlargement instruction for the virtual object or a reduction instruction for the virtual object, according to a length of time duration during which the user observes the virtual object.

9. A terminal device, comprising: a memory having a computer program stored therein; and a processor, the computer program, when executed by the processor, causing the processor to execute steps of: the terminal device acquiring first spatial position information of a marker relative to the terminal device worn by a user, wherein the marker is disposed on a physical object other than the user; acquiring fourth spatial position information of the marker relative to the physical object and fifth spatial position information of the target region relative to the physical object; acquiring second spatial position information of the marker relative to the target region of the physical object based on the fourth spatial position information and the fifth spatial position information; determining third spatial position information of the terminal device relative to the target region based on the first spatial position information and the second spatial position information; acquiring a scaling ratio between the virtual object and the target region; determining display coordinates of the virtual object based on the scaling ratio and the third spatial position information; generating and rendering the virtual object based on the display coordinates superimposing the virtual object, thereby the user views the virtual object, through the terminal device worn by the user, on the target region of the physical object, acquiring movement parameters of the marker relative to the terminal device, when the position and pose information of the marker relative to the terminal device changes, re-determining relative position information between the marker and the terminal device according to the movement parameters; re-acquiring the display coordinates of the virtual object according to the re-determined relative position information, and re-rendering the virtual object using the re-acquired display coordinates.

10. The terminal device according to claim 9, wherein acquiring the scaling ratio between the virtual object and the target region comprises: determining a ratio of a size of the virtual object to a size of the target region as the scaling ratio; or determining a product of the ratio of the size of the virtual object to the size of the target region and a preset coefficient as the scaling ratio.

11. The terminal device according to claim 9, wherein there are at least two virtual objects, and for each of the at least two virtual objects: acquiring the scaling ratio between the virtual object and the target region comprises: acquiring the scaling ratio of the virtual object to the target region; determining a corresponding region of the virtual object on the target region; and adjusting the scaling ratio corresponding to the virtual object according to the corresponding region of the virtual object on the target region.

12. The terminal device according to claim 9, wherein determining the display coordinates of the virtual object comprises: determining, with the target region as an origin, spatial coordinates and rotation information of the terminal device relative to the target region according to the third spatial position information; assigning, in a content space, the determined spatial coordinates and the determined rotation information to the terminal device and a virtual object in a content space, the content space having the virtual object as an origin; and determining the display coordinates of the virtual object based on the scaling ratio, the assigned spatial coordinates and the assigned rotation information.

13. The terminal device according to claim 9, wherein the processor further executes: enlarging the scaling ratio when an enlargement instruction for the virtual object is received; and reducing the scaling ratio when a reduction instruction for the virtual object is received.

14. The terminal device according to claim 9, wherein prior to executing the step of acquiring the second spatial position information, the processor further executes: a step of determining the target region of the physical object according to a selection operation on the target region of the physical object.

15. The terminal device according to claim 14, wherein determining the target region of the physical object comprises: acquiring position and pose information of a control device; and determining the target region based on the position and pose information of the control device.

16. The terminal device according to claim 9, wherein superimposing the virtual object on the target region of the physical object comprises: changing positions of the virtual object viewed by the user as well as the user moves.

17. The terminal device according to claim 9, wherein the processor further executes: determining, by the terminal device, an enlargement instruction for the virtual object or a reduction instruction for the virtual object, according to a length of time duration during which the user observes the virtual object.

18. A non-transitory computer readable storage medium having a computer program stored thereon, the computer program, when executed by a processor, causing the processor to execute steps of: a terminal device acquiring first spatial position information of a marker relative to the terminal device worn by a user, wherein the marker is disposed on a physical object other than the user; acquiring second spatial position information of the marker relative to a target region of the physical object; determining third spatial position information of the terminal device relative to the target region based on the first spatial position information and the second spatial position information; acquiring a scaling ratio between the virtual object and the target region; determining, with the target region as an origin, spatial coordinates and rotation information of the terminal device relative to the target region, according to the third spatial position information; assigning, in a content space, the determined spatial coordinates and the determined rotation information to the terminal device and the virtual object, the content space having the virtual object as an origin; determining display coordinates of the virtual object based on the scaling ratio, the assigned spatial coordinates and the assigned rotation information; generating and rendering the virtual object based on the display coordinates; and displaying the virtual object, thereby the user views the virtual object, through the terminal device worn by the user, on the target region of the physical object.

19. The non-transitory computer readable storage medium according to claim 18, wherein the steps further comprise: determining, by the terminal device, an enlargement instruction for the virtual object or a reduction instruction for the virtual object, according to a length of time duration during which the user observes the virtual object.

* * * * *